(12) United States Patent
Karas et al.

(10) Patent No.: US 11,257,387 B2
(45) Date of Patent: Feb. 22, 2022

(54) SYSTEMS AND METHODS FOR AUTOMATIC SEQUENCING BEHIND PRECEDING AIRCRAFT ON APPROACH

(71) Applicant: HONEYWELL INTERNATIONAL INC., Morris Plains, NJ (US)

(72) Inventors: Ondrej Karas, Prague (CZ); Jakub Cisar, Brno (CZ); Zdenek Padera, Bene-ov (CZ); Jiri Gazarek, Rousinov (CZ)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 148 days.

(21) Appl. No.: 16/825,687

(22) Filed: Mar. 20, 2020

(65) Prior Publication Data

US 2021/0295721 A1    Sep. 23, 2021

(51) Int. Cl.
G08G 5/02       (2006.01)
G01S 13/91      (2006.01)
G08G 5/00       (2006.01)

(52) U.S. Cl.
CPC .............. *G08G 5/02* (2013.01); *G01S 13/913* (2013.01); *G08G 5/0013* (2013.01); *G08G 5/0021* (2013.01)

(58) Field of Classification Search
CPC ...... G08G 5/02; G08G 5/0013; G08G 5/0021; G08G 5/0091; G08G 5/0078; G08G 5/025; G08G 5/0004; G01S 13/913
See application file for complete search history.

(56) References Cited

U.S. PATENT DOCUMENTS

| 5,121,325 | A | * | 6/1992 | DeJonge | G05D 1/0005 |
| | | | | | 244/182 |
| 7,412,324 | B1 | | 8/2008 | Bagge et al. | |
| 8,112,224 | B2 | | 2/2012 | Lucas et al. | |
| 8,155,811 | B2 | * | 4/2012 | Noffsinger | G05D 1/0206 |
| | | | | | 701/21 |
| 8,775,062 | B2 | | 7/2014 | Becher et al. | |
| 8,924,069 | B1 | | 12/2014 | Kaneshige et al. | |
| 9,067,583 | B2 | * | 6/2015 | Taguchi | B60W 20/00 |
| 9,262,930 | B2 | | 2/2016 | De Prins | |
| 9,384,667 | B2 | | 7/2016 | Klang et al. | |
| 9,418,563 | B2 | | 8/2016 | Marcy et al. | |
| 10,037,689 | B2 | * | 7/2018 | Taylor | G06K 7/10475 |
| 10,037,704 | B1 | * | 7/2018 | Myr | G08G 5/0026 |
| 10,347,142 | B2 | | 7/2019 | Brandao et al. | |

(Continued)

*Primary Examiner* — Bhavesh V Amin
(74) *Attorney, Agent, or Firm* — Lorenz & Kopf, LLP

(57) ABSTRACT

Methods and systems for automatic sequencing of an ownship aircraft behind a lead aircraft on an approach to a runway. The method determines that the ownship aircraft is in an instrument approach. A pilot selection of the lead aircraft is confirmed as matching the lead aircraft identified in an air traffic control (ATC) command. The method includes calculating, an arrival time of the lead aircraft at the runway; processing the arrival time of the lead aircraft at the runway with a desired separation time to determine a target point for the ownship aircraft to merge onto a centerline of the runway; and automatically, and without further human input, generate lateral guidance, vertical guidance, and speed targets for the ownship aircraft to join the runway centerline at the target point at the desired separation time after the lead aircraft.

20 Claims, 4 Drawing Sheets

(56) References Cited

U.S. PATENT DOCUMENTS

| | | | |
|---|---|---|---|
| 2007/0061055 A1 | 3/2007 | Stone et al. | |
| 2008/0133120 A1* | 6/2008 | Romanick | G01C 21/3469 701/123 |
| 2008/0249667 A1* | 10/2008 | Horvitz | B60W 40/076 701/1 |
| 2008/0300738 A1* | 12/2008 | Coulmeau | G01C 21/20 701/3 |
| 2010/0010732 A1* | 1/2010 | Hartman | G01C 21/3469 701/532 |
| 2010/0145600 A1* | 6/2010 | Son | G08G 1/096716 701/123 |
| 2011/0118908 A1* | 5/2011 | Boorman | G08G 5/0052 701/14 |
| 2012/0191333 A1* | 7/2012 | Sawhill | G08G 5/0017 701/122 |
| 2013/0158838 A1* | 6/2013 | Yorke | B60W 30/18018 701/103 |
| 2014/0244130 A1* | 8/2014 | Filev | B60K 31/00 701/96 |
| 2014/0257598 A1* | 9/2014 | Bailey | G06F 7/00 701/3 |
| 2015/0141043 A1* | 5/2015 | Abramson | H04W 4/027 455/456.1 |
| 2015/0168174 A1* | 6/2015 | Abramson | G01C 21/3626 701/408 |
| 2015/0232097 A1* | 8/2015 | Luther | B61L 3/006 701/123 |
| 2015/0269846 A1* | 9/2015 | De Prins | G08G 5/0082 701/120 |
| 2015/0310737 A1* | 10/2015 | Simanowski | G08G 1/087 340/910 |
| 2016/0216130 A1* | 7/2016 | Abramson | G01C 21/3423 |
| 2016/0275801 A1* | 9/2016 | Kopardekar | G08G 5/0069 |
| 2016/0334233 A1* | 11/2016 | Baverstock | B60W 30/16 |
| 2016/0358481 A1* | 12/2016 | Vesely | G08G 5/045 |
| 2017/0030734 A1 | 2/2017 | Shafaat et al. | |
| 2017/0358218 A1 | 12/2017 | Einset et al. | |
| 2017/0365178 A1* | 12/2017 | Shay | G08G 5/0034 |

\* cited by examiner

SYSTEMS AND METHODS FOR AUTOMATIC SEQUENCING BEHIND PRECEDING AIRCRAFT ON APPROACH

TECHNICAL FIELD

The present invention generally relates to aircraft systems that provide flight guidance, and more particularly relates to aircraft systems and methods for automatic sequencing behind preceding aircraft on approach.

BACKGROUND

It is a common procedure at major airports for ATC (Air Traffic Control) to clear arriving aircraft for a visual or instrument approach, preceded by radar vectors (instructions issued by ATC to facilitate the smooth and expeditious flow of traffic). The approach clearance is often accompanied by a request to maintain a prescribed visual separation, referred to as a "safe separation," time from a preceding aircraft. In these scenarios, it is up to the pilot to rely on visual cues and to manually adjust a heading, a rate of descent and an airspeed of the ownship aircraft, such that the preceding aircraft is followed with the safe separation.

The demands of maintaining visual separation during a visual approach cause a significantly and objectively increased workload on a pilot during approach, since they require the pilot to continuously scan flight instruments, follow traffic outside of the ownship aircraft, prepare for an approach and, complete checklist items. Because maintaining visual separation during an approach is reliant upon visual cues, its accuracy presents a technical problem. It is further a technical problem in that it can only be performed in VMC (Visual Meteorological Conditions).

These technical problems can lead to further technical problems, such as, reduced efficiency for pilots and airports. For example, due to the workload described above, the pilot may not have time and mental capacity left to optimize a trajectory of the ownship aircraft, to reduce fuel burn, noise and emissions. Additionally, pilots may be inclined to overcompensate under stress, by maintaining a larger than prescribed separation from the preceding traffic. This, in turn, reduces the capacity of the airport.

Known available solutions have their own limits. One available technical solution is CAVS, or CDTI Assisted Visual Separation (CDTI stands for Cockpit Display of Traffic Information). However, CAVS still requires the pilot to read and interpret traffic textual information (such as distance and closure rate) and to manually adjust a heading, a descent rate and a speed target based thereon. Another available solution is an "automatic paired approach." However, automatic paired approach systems are directed to parallel runways and the final approach segment. Additionally, there are some available formation-flying algorithms. However, they are directed to the narrow issue of maintaining a specific position with respect to a lead aircraft, they are not understood to guide aircraft on final approach.

Accordingly, improved aircraft systems and methods that provide automatic sequencing behind preceding aircraft on approach, are desirable. Furthermore, other desirable features and characteristics of the present invention will be apparent from the subsequent detailed description and the appended claims, taken in conjunction with the accompanying drawings and the foregoing technical field and background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

Provided is a method for an ownship aircraft to sequence behind a lead aircraft on an approach to a runway. The method includes: receiving, by a processing system onboard the ownship aircraft, an altitude, a position, and a velocity for the ownship aircraft; receiving, by the processing system, a position, an elevation and an orientation of the runway; determining, by the processing system, that the ownship aircraft is operating in a instrument approach; receiving, by the processing system via a traffic system, a turbulence category, an altitude, a position, and a velocity for the lead aircraft; receiving, from a user interface, a pilot selection of the lead aircraft; and by the processing system, responsive to the pilot selection of the lead aircraft: calculating, an arrival time of the lead aircraft at the runway; determining a target point for the ownship aircraft to merge onto a centerline of the runway by processing the arrival time of the lead aircraft at the runway with a desired separation time; and computing and providing vertical commands, lateral commands, and a speed target to guide the ownship aircraft to a final approach segment with a desired separation from the lead aircraft and at an optimal profile in terms of fuel burn and speed conditions.

Also provided is a system for sequencing an ownship behind a lead aircraft on an approach to a runway. The system includes: a communication module that receives traffic data including a turbulence category, an altitude, a position, and a velocity for the lead aircraft; a processing system coupled to the communication module and programmed to: receive an altitude, a position, and a velocity for the ownship aircraft; receive a position, an elevation and an orientation of the runway; determine that the ownship aircraft is operating in a instrument approach receive, from a user interface, a pilot selection of the lead aircraft; and responsive to the pilot selection of the lead aircraft: calculate, an arrival time of the lead aircraft at the runway; determine a target point for the ownship aircraft to merge onto a centerline of the runway by processing the arrival time of the lead aircraft at the runway with a desired separation time; and automatically computes and provides vertical commands, lateral commands, and a speed target to guide the ownship aircraft to a final approach segment with a desired separation and at an optimal profile in terms of fuel burn and speed conditions.

A method for sequencing of an ownship aircraft behind a lead aircraft on an approach to a runway is provided. The method includes: at a processing system onboard the ownship, receiving, from a flight management system (FMS), an altitude, a position, and a velocity for the ownship aircraft; receiving a position, an elevation and an orientation of the runway; receiving and processing data from a radar module to determine that the ownship aircraft is operating in an instrument approach; receiving, from a traffic information broadcast system (TIS-B), a turbulence category, an altitude, a position, and a velocity for the lead aircraft; receiving, from a user interface, a pilot selection of the lead aircraft; and responsive to the pilot selection of the lead aircraft: calculating, an arrival time of the lead aircraft at the runway; processing the arrival time of the lead aircraft at the runway with a desired separation time to determine a target point for the ownship aircraft to merge onto a centerline of the runway; and providing the target point to the FMS.

Furthermore, other desirable features and characteristics of the [system/method] will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
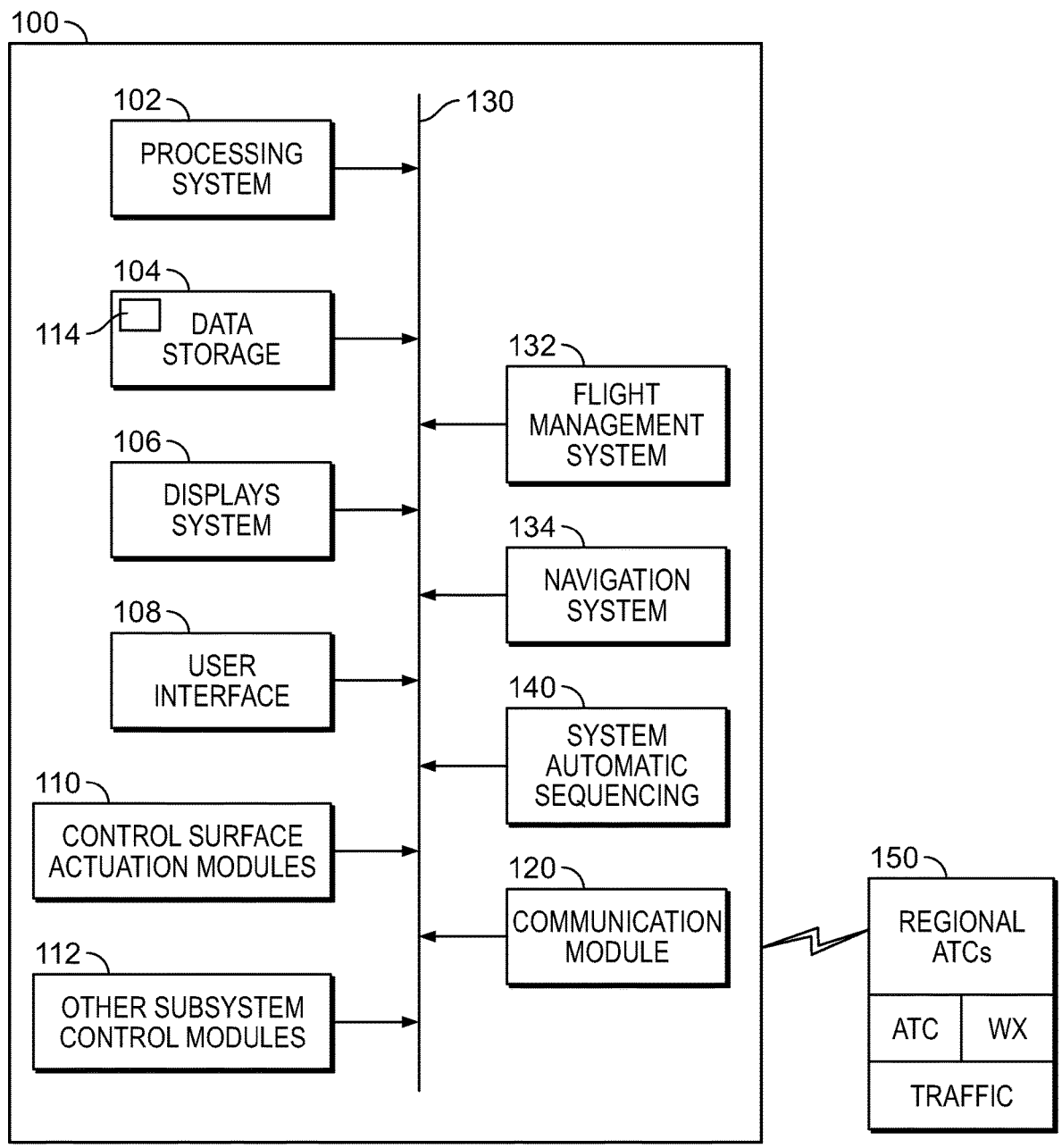
FIG. 1 is a schematic block diagram of an aircraft system including a system for automatic sequencing behind preceding aircraft on approach, in accordance with various embodiments.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

As alluded to, maneuvering visually prior to joining a final approach is one of the least automated and most unpredictable phases of flight, which also concentrates some of the highest workload, since the visual approach requires the pilot to continuously scan flight instruments, follow traffic outside of the ownship aircraft, prepare for the approach, and complete checklist items. Further, the visual approach is reliant upon visual cues and can only be performed in VMC (Visual Meteorological Conditions). Under the stress of these visual approach scenarios, pilots may be inclined to overcompensate, by maintaining a larger than the prescribed separation time from the preceding traffic. Alternately, a pilot may inadvertently get too close behind the preceding aircraft (i.e., a smaller time than the safe separation time). When a pilot gets too close to the preceding aircraft, the pilot may encounter wake turbulence, and/or may be required to abort the approach and perform a go-around procedure at that time. Each of these potential pilot reactions to visual procedures can reduce the efficiency and capacity of the airport and the aircraft.

Available solutions have known limitations. For example, CAVS is very cognitively demanding, as seeing traffic information presented on a display, accompanied with textual information such as a distance and a closure rate, is not an intuitive human-machine interface, and may lead to the pilot misjudging the information presented. And, automatic paired approach systems are limited to controlling airspeed of the trailing aircraft, and only once it is established on a final approach segment.

The embodiments described herein provide a technical solution that improves upon the functionality of flight guidance systems for approach procedures and also provide an objectively improved human-machine interface during this cognitively demanding time. The embodiments provided join the current flight to a final approach segment to a given runway while maintaining a desired safe separation time from preceding aircraft. The embodiments provided automate a much larger portion of the approach. Specifically, and advantageously, the embodiments provided generate lateral guidance, vertical guidance, and speed targets, to thereby automate the turning and descending task with an assured safe separation.

FIG. 1 is a schematic block diagram of an aircraft system 100 with a system for automatic sequencing behind preceding aircraft on approach (shortened herein to system for automatic sequencing) 140, in accordance with an exemplary embodiment. The illustrated embodiment of the aircraft system 100 includes, without limitation: at least one processing system 102; an appropriate amount of data storage 104; a displays system 106; a user interface 108; control surface actuation modules 110; other subsystem control modules 112; a flight management system (FMS) 132, a navigation system 134, a system for automatic sequencing 140 and a communication module 120. These elements of the aircraft system 100 may be coupled together by a suitable interconnection architecture 130 that accommodates data communication, the transmission of control or command signals, and/or the delivery of operating power within the aircraft system 100. It should be understood that FIG. 1 is a simplified representation of the aircraft system 100 that will be used for purposes of explanation and ease of description, and that FIG. 1 is not intended to limit the application or scope of the subject matter in any way. In practice, the aircraft system 100 and the host aircraft will include other devices and components for providing additional functions and features, as will be appreciated in the art. Furthermore, although FIG. 1 depicts the aircraft system 100 as a single unit, the individual elements and components of the aircraft system 100 could be implemented in a distributed manner using any number of physically distinct pieces of hardware or equipment.

The processing system 102 may be implemented or realized with one or more general purpose processors, content addressable memory, digital signal processors, application specific integrated circuits, field programmable gate arrays, any suitable programmable logic devices, discrete gate or transistor logic, discrete hardware components, or any combination designed to perform the functions described here. A processor device may be realized as a microprocessor, a controller, a microcontroller, or a state machine. Moreover, a processor device may be implemented as a combination of computing devices (e.g., a combination of a digital signal processor and a microprocessor, a plurality of microprocessors, one or more microprocessors in conjunction with a digital signal processor core, or any other such configuration).

As alluded to, the lead aircraft is initially identified in a command received from air traffic control (ATC), in the course of clearing the ownship aircraft for an instrument or visual approach. As described in more detail below, the processing system 102 may implement an automatic sequencing algorithm, which may be embodied in a software program 114, and, when operating in that context, may be considered the system for automatic sequencing 140. In accordance with various embodiments, processing system 102 is configured to execute the automatic sequencing algorithm to perform the tasks of, at least, calculating an arrival time of the lead aircraft at the runway, determining a target point for the ownship aircraft to merge onto a centerline of the runway, and guide the ownship aircraft (i) to join the runway centerline at the target point, and (ii) to assure the ownship aircraft stays at the desired separation time after the lead aircraft.

In addition, the processing system 102 may generate commands, which may be communicated through interconnection architecture 130 to various other aircraft system 100 components. Such commands may cause the various system components to alter their operations, provide information to the processing system 102, or perform other actions, non-limiting examples of which will be provided below.

The data storage 104 may be realized as RAM memory, flash memory, EPROM memory, EEPROM memory, registers, a hard disk, a removable disk, a CD-ROM, or any other form of storage medium known in the art. In this regard, the data storage 104 can be coupled to the processing system 102 such that the processing system 102 can read information from, and write information to, the data storage 104. In various embodiments, the data storage 104 may be initialized to have stored therein the software program 114, containing the programming instructions of the automatic sequencing algorithm. In the alternative, the data storage 104 may be integrated with the processing system 102. As an example, the processing system 102 and the data storage 104 may reside in an ASIC.

In practice, any functional or logical module/component of the aircraft system 100 might be realized as an algorithm embodied in program code that is maintained in the data storage 104. For example, the processing system 102, the displays system 106, the control modules 110, 112, and/or the communication module 120 may have associated software program components that are stored in the data storage 104. Accordingly, as used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. In various embodiments, modules of aircraft system 100 are stored in data storage 104 and executed by processing system 102.

The displays system 106 includes one or more lateral displays, vertical displays, and multi-function displays and associated graphics processors. Processing system 102 and displays system 106 cooperate to display, render, or otherwise convey one or more graphical representations, synthetic displays, graphical icons, visual symbology, or images associated with operation of the host aircraft. An embodiment of the aircraft system 100 may utilize existing graphics processing techniques and technologies in conjunction with the displays system 106. For example, displays system 106 may be suitably configured to support well known graphics technologies such as, without limitation, VGA, SVGA, UVGA, or the like.

User interface 108 is suitably configured to receive input from a user (e.g., a pilot) and, in response to the user input, to supply appropriate command signals to the processing system 102. The user interface 108 may include any one, or any combination, of various known user interface devices or technologies, including, but not limited to: a cursor control device such as a mouse, a trackball, or joystick; a keyboard; buttons; switches; knobs; levers; or dials. Moreover, the user interface 108 may cooperate with the displays system 106 to provide a graphical user interface. Thus, a user can manipulate the user interface 108 by moving a cursor symbol rendered on a display, moving a finger along a touch screen surface, and the user may use a keyboard to, among other things, input textual data. For example, after receiving ATC commands to follow a lead aircraft, the pilot could view a display of a plurality of traffic on a displays system 106 and manipulate the user interface 108 to select the lead aircraft from among the plurality of traffic displayed, for use by the processing system 102, and the like.

In an exemplary embodiment, the communication module 120 is suitably configured to support data communication between the host aircraft and one or more external sources 150. For example, the communication module 120 may be designed and configured to enable the host aircraft to communicate with a plurality of regional air traffic control (ATC) authorities, weather data sources that provide wind velocity and wind direction at runways, as well as satellite weather reports (wind velocity and wind direction at various geographic areas along the flight plan), automatic terminal information service (ATIS), other ground and air communications, etc. In this regard, the communication module 120 may include or support a datalink subsystem that can be used to communicate with external sources 150, such as air traffic control (ATC) and satellite weather data providers (WX), preferably in compliance with known standards and specifications.

In certain implementations, the communication module 120 is also used to communicate with other aircraft (often referred to as traffic) that are near the host aircraft and optionally also with ground vehicles. As such, the communication module 120 may be configured for compatibility with a Traffic Information System Broadcast (TIS-B), Automatic Dependent Surveillance-Broadcast (ADS-B) technology, with Traffic and Collision Avoidance System (TCAS) technology, and/or with similar technologies. Received traffic data for each traffic aircraft may include an altitude, position information (location and orientation), a flight identification, velocity information, turbulence category information, and the like.

Flight management system 132 (FMS) (or, alternatively, a flight management computer) is located onboard an aircraft and is included in aircraft system 100. Flight management system 132 is coupled to displays system 106 and may include one or more additional modules or components as necessary to support navigation, flight planning, and other aircraft control functions in a conventional manner. In addition, the flight management system 132 may include or otherwise access a terrain database, airport and navigational databases (including airport diagrams, with locations, elevations, geometries, and orientations of runways and runway centerlines, STAR, SID, and en route procedures, for example), geopolitical database, taxi database, or other information for rendering a navigational map or other content on displays system 100, as described below. The FMS 132 is capable of tracking a flight plan and also allowing a pilot and/or autopilot system (not shown) to make changes to the flight plan, as described below. In various embodiments, the processing system 102 provides the FMS 132 with the target point (described below).

The navigation system 134 is configured to obtain one or more navigational parameters associated with operation of an aircraft. The navigation system 134 may include a global positioning system (GPS), inertial reference system (IRS) and/or a radio-based navigation system (e.g., VHF omni-directional radio range (VOR) or long range aid to navigation (LORAN)), and may include one or more navigational radios or other sensors suitably configured to support operation of the navigation system, as will be appreciated in the art. In an exemplary embodiment, the navigation system 134 is capable of obtaining and/or determining navigation data, including but not limited to: the altitude, the current location of the aircraft (e.g., with reference to a standardized geographical coordinate system); the heading of the aircraft (i.e., the direction the aircraft is traveling in relative to some reference); the ground speed or velocity; and, the orientation (roll, pitch, yaw) of the aircraft. A combination of the location and orientation may be referred to as a position of the ownship aircraft. The navigation system 134 provides the navigation data to the interconnection architecture 130, from which other aircraft system 100 components, such as the processing system 102, may receive and process the navigation data.

Control surface actuation modules 110 include electrical and mechanical systems configured to control the orientation of various flight control surfaces (e.g., ailerons, wing flaps, rudder, and so on). Processing system 102 and control surface actuation modules 110 cooperate to adjust the orientation of the flight control surfaces in order to affect the attitude and flight characteristics of the host aircraft.

Processing system 102 also may communicate with other subsystem control modules 112 to affect various aspects of aircraft operations. For example, but not by way of limitation, the other subsystem control modules 112 may include, a throttle/thrust control module, a flight director heading select module, a flight director vertical speed module, a propulsion system, and a radar module that signals to the processing system 102 when the ownship aircraft is flying in a visual or radar mode. In various embodiments, the subsystem control modules 112 further include, a landing gear actuation module, a cabin environment control system and a data entry system.

Figure 2:
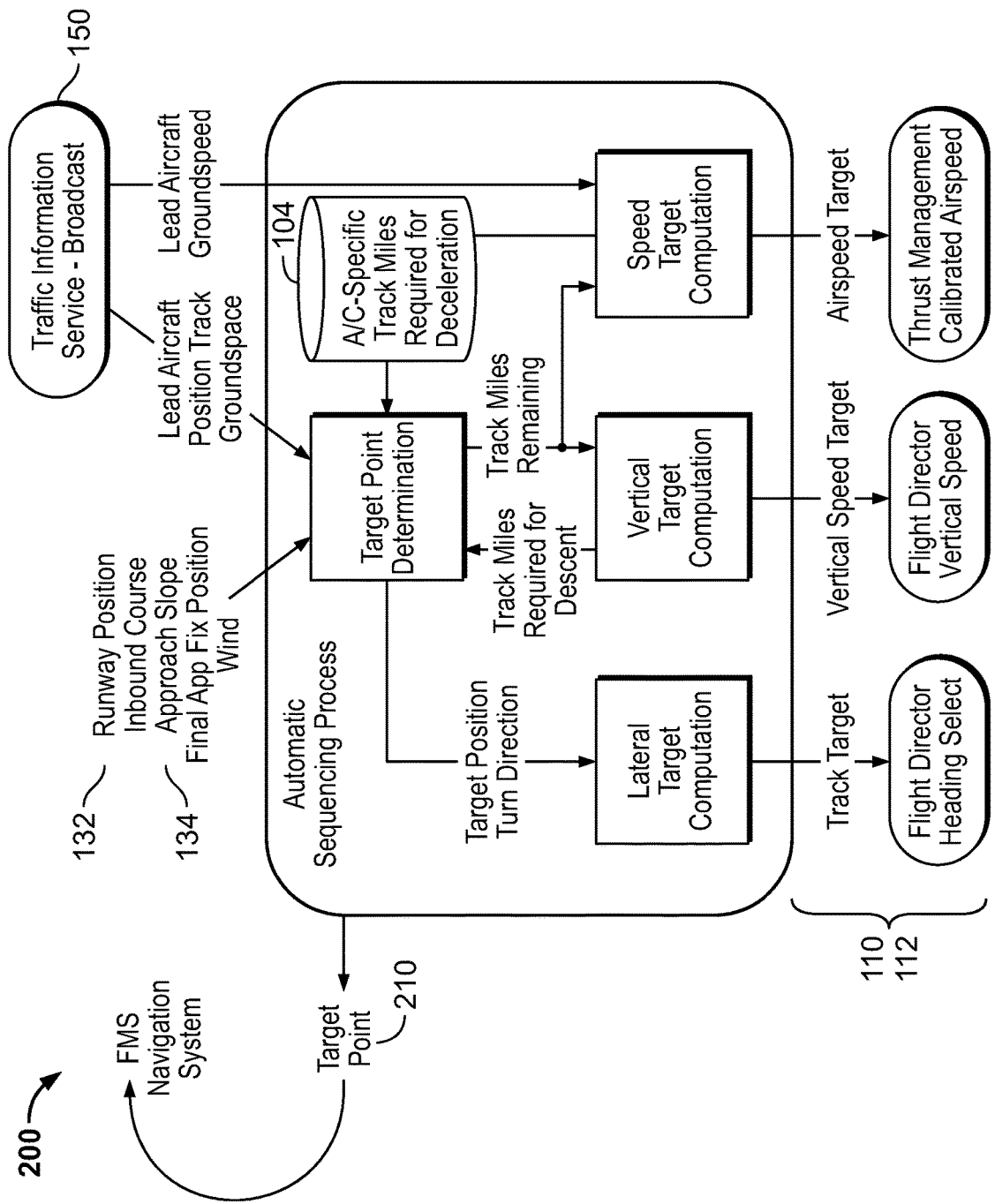
FIG. 2 is a process diagram depicting various processes performed by the system for automatic sequencing behind preceding aircraft on approach, in accordance with various embodiments.

FIG. 2 is a process diagram showing an exemplary partition of automatic sequencing processes 200. In an embodiment, the automatic sequencing processes 200 may be implemented as software program modules, for example, collectively, as a program product that can be uploaded into an aircraft system 100 and executed by a processing system 102. In various embodiments, automatic sequencing processes 200 are implemented as an application specific integrated circuit. In still other embodiments, automatic sequencing processes 200 are implemented as a combination of hardware and software. In an embodiment, a target point determination process 202 receives some onboard data and some data from external sources 150. The target point determination process 202 receives a runway position, inbound course for the ownship aircraft, approach slope, final approach fix position, and wind data (this information may be received from on-board aircraft systems such as the FMS 132 and/or the navigation system 134). An external source 150, such as a traffic information service-broadcast (TIS-B) provides the target point determination process 202 with lead aircraft position, track, and ground speed (or velocity). The target point determination process 202 determines track miles remaining, and a target position turn direction. In various embodiments, the target point determination process 202 makes these determinations by processing received inputs with an aircraft-specific track miles required for deceleration for the ownship (in an embodiment, this value may be stored in the data storage 104).

As mentioned above, the automatic sequencing algorithm advantageously automates the turning and descending components of flying the visual approach while assuring the safe separation. In the exemplary embodiment shown in FIG. 2, to meet this objective, the automatic sequencing processes 200 may be partitioned as a speed target computation process 204, a vertical target computation process 206 directed to descents, and a lateral computation process 208 directed to turning, each of which receive and process inputs from the target point determination process 202, and each generating signals that command and control other subsystem control modules 112, and/or control surface actuation modules 110 to effect the automated turning and descending of the ownship aircraft flight. Additionally, the target point 210 that is determined by the automatic sequencing processes 200 is an output that can be provided to the FMS 132 for navigation.

Figure 3:
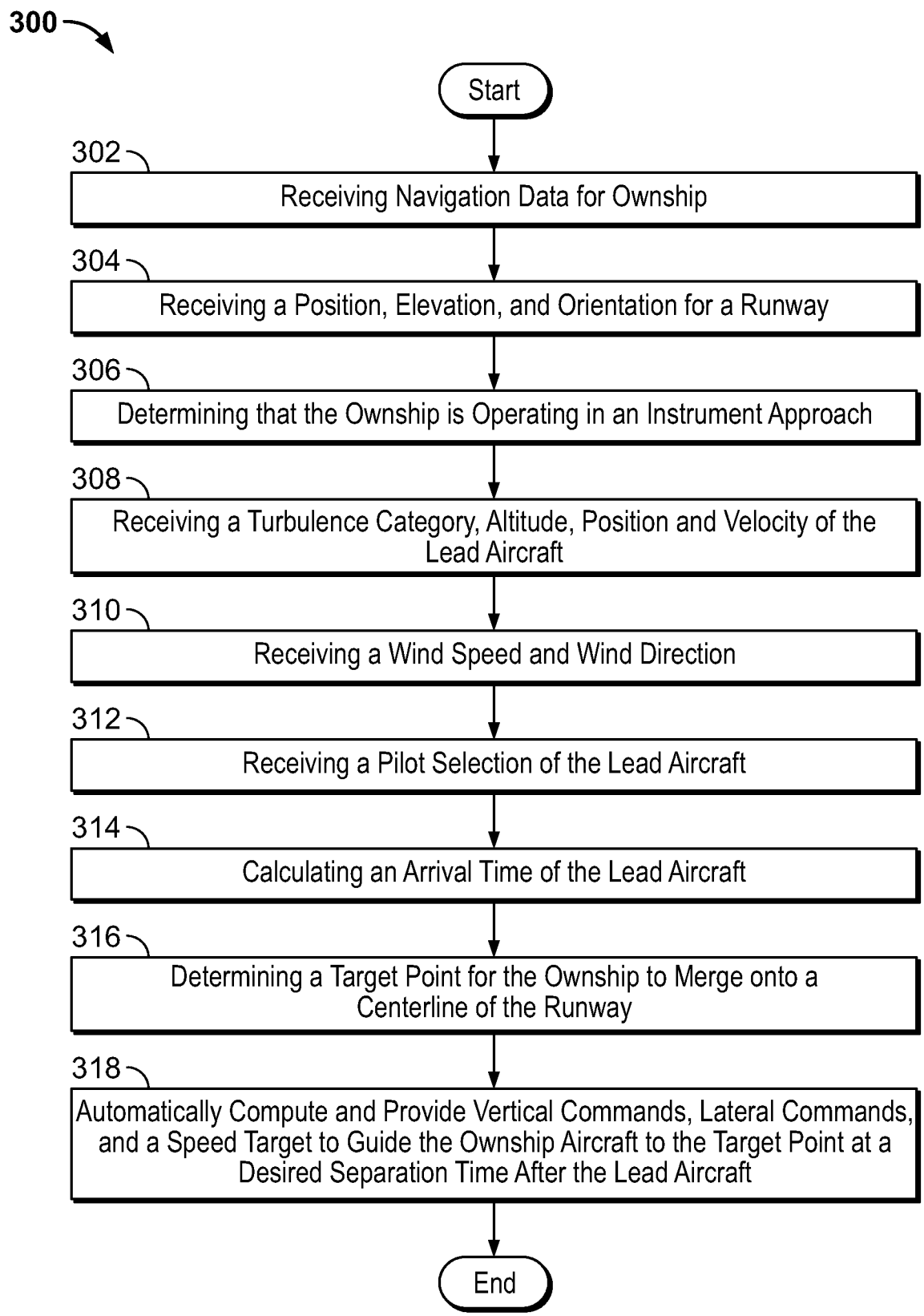
FIG. 3 is a flowchart of a method for automatic sequencing behind preceding aircraft on approach, in accordance with various embodiments.

In FIG. 3, with reference to FIGS. 1-2, the aircraft system 100 described above may be implemented by a processor-executable method 300 for automatic sequencing. For illustrative purposes, the following description of method 300 may refer to elements mentioned above in connection with FIGS. 1-2. In practice, portions of method 300 may be performed by different components of the described system. It should be appreciated that method 300 may include any number of additional or alternative tasks, the tasks shown in FIG. 3 need not be performed in the illustrated order, and method 300 may be incorporated into a more comprehensive procedure or method having additional functionality not described in detail herein. Moreover, one or more of the tasks shown in FIG. 3 could be omitted from an embodiment of the method 300 as long as the intended overall functionality remains intact.

The method starts, and at 302 navigation data for the ownship aircraft is received. In an embodiment, the navigation data includes an altitude, a position, and a velocity for the ownship aircraft. A position, elevation, and orientation for a runway is received or referenced at 304. In various embodiments, 306 is omitted. In other embodiments, at 306, the processing system 102 confirms that the ownship is operating an instrument approach preceded by radar vectors), this may be done by the processing system 102 receiving and processing radar vectors in the other subsystems and control modules 112. A turbulence category for the lead aircraft, as well as an altitude, position, and velocity of the lead aircraft is received or identified from among a plurality of received traffic data at 308. In various embodiments, a lead aircraft heading and track is expected to be the runway heading. In various embodiments, a TIS-B system provides the traffic data. In various embodiments, a wind speed and wind direction may be received from a weather data source at 310. Although illustrated sequentially, the method steps 302-310 can be occurring concurrently and updating as appropriate. At 312, a pilot selection of the lead aircraft triggers the aircraft system 100 to begin the automatic sequencing algorithm based on the available data and information from method steps 302-310. In various embodiments, the processing system 102 prompts the pilot to select a lead aircraft via an alphanumeric message on the displays system 106, and the pilot selection is responsive to the prompt. In various embodiments, the processing system 102 compares the pilot selected lead aircraft to a lead aircraft identified in a command from ATC to confirm that the correct lead aircraft has been selected by the pilot before moving to the next steps.

The automatic sequencing algorithm may include the following steps. An arrival time of the lead aircraft at the runway is calculated at 314. A target point for the ownship to merge onto a centerline of the runway is determined at 316 to be a desired separation time later than the lead aircraft passes through the same point. At 318, the sequencing method automatically, and without further human input, computes and provides vertical commands, lateral commands, and a speed target to: (i) guide the ownship to the final approach segment via the target point (ii) with a desired separation from preceding lead aircraft and at an optimum descent profile for the ownship aircraft in terms of fuel burn and time of flight. The provided flight guidance can be flight director vertical and lateral commands, as well as a speed target; autopilot is not required. In various scenarios, a pilot may follow the flight director guidance and speed target manually. In an embodiment, the provided flight guidance can be followed by pilot, manually. In an embodiment, when Autopilot and Autothrottle functions are engaged, the provided flight guidance can be fully automated.

Figure 4:
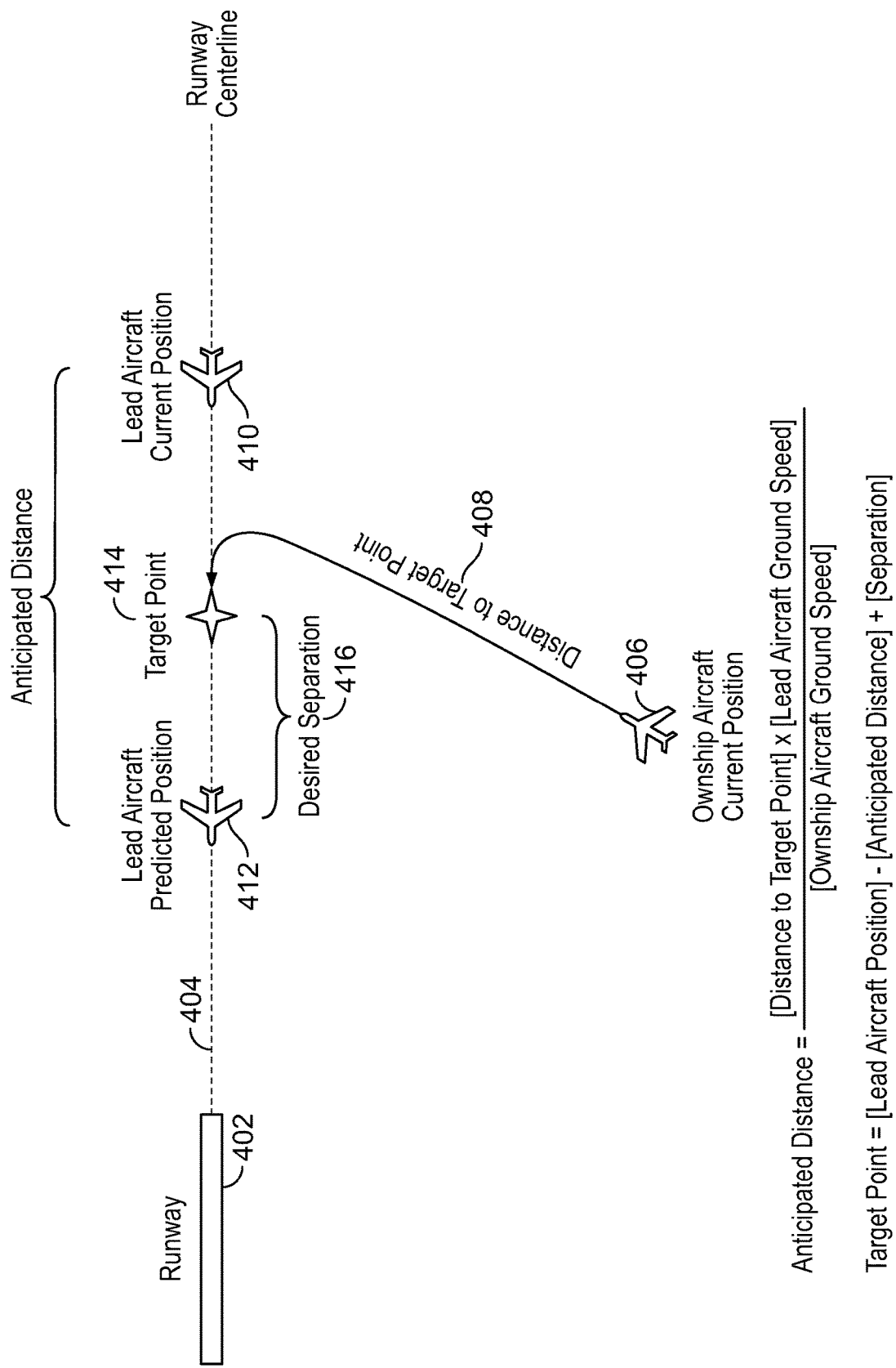
FIG. 4 is an illustration of a use case for the system for automatic sequencing behind preceding aircraft on approach, in accordance with various embodiments.

In various embodiments, as shown in FIG. 4, at 318 includes turning the heading of the ownship aircraft, as described with respect to the lateral target computation processes 208 and the target position turn direction. The vertical commands, lateral commands, and speed target guidance from above may include commanding and controlling various subsystem control modules 112 and control surface actuation modules 110 to automate the turning and descending that is required to get the ownship aircraft to the target point as described herein. In various embodiments, the desired separation time is provided by ATC in a command that identifies the lead aircraft. In various embodiments, the desired separation time is retrieved from a stored lookup table that takes into account aircraft specific parameters for the ownship aircraft and the lead aircraft. The automatic sequencing algorithm is illustrated in more detail in connection with FIG. 4.

Turning now to FIG. 4, and with reference to FIGS. 1-3, a use case illustration is provided. Runway 402 with runway centerline 404 is shown. Ownship aircraft is on a current flight at current position 406. The lead aircraft is identified at an initial position 410 (recall position herein refers to location and orientation) on an approach to at the runway 402. The aircraft system 100 processes available received data, such as the velocity (ground speed) of the lead aircraft and the initial position 410 of the lead aircraft, to calculate an arrival time of the lead aircraft at the runway 402. The aircraft system 100 determines a distance to a target point 408 on the runway centerline 404 by referencing the arrival time of the lead aircraft, a desired safe separation 416, the current position 406 of the ownship aircraft and the velocity (ground speed) of the ownship aircraft. The aircraft system 100 may anticipate, based on available data that the lead aircraft will be at position 412 when the ownship aircraft arrives at the target point 414, which accommodates the desired safe separation 416. Once the aircraft system 100 has determined these values, the aircraft system 100 implements the processes described in connection with FIG. 2 to guide the ownship aircraft from the current position 406 to the target point 414, and from the target point 414 to a safe landing on the runway 402. As shown and described with respect to the illustration in FIG. 4, this automated guidance may include a turn and a descent. Flight guidance from the current position 406 to the target point 414 may include turning and descent guidance. Flight guidance from the target point 414 to a safe landing on the runway 402 does not include turning, but includes speed control guidance for descent. Thus, the aircraft system 100 provides a functional improvement over available flight guidance systems, as well as objectively improving the human-machine interface during an instrument approach.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

As mentioned, the steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for an ownship aircraft to sequence behind a lead aircraft on an approach to a runway, comprising:
   receiving, by a processing system onboard the ownship aircraft, an altitude, a position, and a velocity for the ownship aircraft;
   receiving, by the processing system, a position, an elevation and an orientation of the runway;
   receiving, by the processing system via a traffic system, a turbulence category, an altitude, a position, and a velocity for the lead aircraft;
   receiving, from a user interface, a pilot selection of the lead aircraft; and by the processing system, responsive to the pilot selection of the lead aircraft:
   calculating, an arrival time of the lead aircraft at the runway;
   determining a target point for the ownship aircraft to merge onto a centerline of the runway by processing the arrival time of the lead aircraft at the runway with a desired separation time; and
   computing and providing vertical commands, lateral commands, and a speed target to guide the ownship aircraft to the target point with the desired separation from the lead aircraft and at an optimal profile in terms of fuel burn and speed conditions.

2. The method of claim 1, wherein the traffic system is a traffic information system broadcast (TIS-B).

3. The method of claim 2, wherein lead aircraft selected by the pilot is consistent with a command received from air traffic control (ATC) that identified the lead aircraft.

4. The method of claim 3, wherein the processing system receives, from a flight management system (FMS) onboard the ownship aircraft: the altitude, the position, and the velocity for the ownship aircraft; and, the position, the elevation and the orientation of the runway; and further comprising:
   providing the flight management system (FMS) with the target point.

5. The method of claim 4, further comprising receiving weather data comprising a wind speed and a wind direction, and wherein determining the target point further is based on processing the weather data.

6. The method of claim 2, wherein computing and providing vertical commands, lateral commands, and a speed target to guide the ownship aircraft to the target point includes a turn by the ownship aircraft.

7. The method of claim 2, wherein computing and providing vertical commands, lateral commands, and a speed target to guide the ownship aircraft to the target point includes guidance for a final descent.

8. A system for sequencing an ownship behind a lead aircraft on an approach to a runway, comprising:
   a communication module that receives traffic data including a turbulence category, an altitude, a position, and a velocity for the lead aircraft;
   a processing system coupled to the communication module and programmed to:
   receive an altitude, a position, and a velocity for the ownship aircraft;
   receive a position, an elevation and an orientation of the runway;
   receive, from a user interface, a pilot selection of the lead aircraft; and
   responsive to the pilot selection of the lead aircraft:
      calculate, an arrival time of the lead aircraft at the runway;
      determine a target point for the ownship aircraft to merge onto a centerline of the runway by processing the arrival time of the lead aircraft at the runway with a desired separation time; and
      automatically compute and provide vertical commands, lateral commands, and a speed target to guide the ownship aircraft to the target point at the desired separation time.

9. The system of claim 8, wherein the communication module receives the traffic data from a traffic information system broadcast (TIS-B).

10. The system of claim 9, wherein the communication module further receives weather data, and wherein determining the target point is further based upon processing the weather data.

11. The system of claim 9, wherein lead aircraft selected by the pilot is consistent with a command received from air traffic control (ATC) that identified the lead aircraft.

12. The system of claim 9, wherein the processing system receives, from a flight management system (FMS) onboard the ownship aircraft: the altitude, the position, and the velocity for the ownship aircraft; the position, the elevation and the orientation of the runway; and the wind speed wind direction, and further comprising:
   providing the flight management system (FMS) with the target point.

13. The system of claim 8, wherein the vertical commands and lateral commands include a turn of direction for the ownship aircraft.

14. The system of claim 8, wherein the vertical commands, lateral commands, and speed target a final approach segment.

15. A method sequencing of an ownship aircraft behind a lead aircraft on an approach to a runway, comprising:
at a processing system onboard the ownship,
  receiving, from a flight management system (FMS), an altitude, a position, and a velocity for the ownship aircraft;
  receiving a position, an elevation and an orientation of the runway;
  receiving and processing data from a radar module to determine that the ownship aircraft is operating in an instrument approach;
  receiving, from a traffic information broadcast system (TIS-B), a turbulence category, an altitude, a position, and a velocity for the lead aircraft;
  receiving, from a user interface, a pilot selection of the lead aircraft; and
  responsive to the pilot selection of the lead aircraft:
  calculating, an arrival time of the lead aircraft at the runway;
  processing the arrival time of the lead aircraft at the runway with a desired separation time to determine a target point for the ownship aircraft to merge onto a centerline of the runway; and
  providing the target point to the FMS.

16. The method of claim 15, further comprising, responsive to receiving the target point, at the FMS: automatically, and without further human input, guiding the ownship aircraft to join the runway centerline at the target point and to land at the runway the desired separation time after the lead aircraft.

17. The method of claim 16, further comprising determining that the lead aircraft selected by the pilot is consistent with a command received from air traffic control (ATC) that identified the lead aircraft.

18. The method of claim 17, wherein the processing system receives, from the FMS: the position, the elevation and the orientation of the runway.

19. The method of claim 15, further comprising receiving weather data, and wherein determining the target point further is based on processing the weather data.

20. The method of claim 19, wherein the processing system receives the weather data from the FMS, and wherein the weather data includes a wind speed and a wind direction.

* * * * *